US010205390B1

(12) United States Patent
Chakraborty et al.

(10) Patent No.: US 10,205,390 B1
(45) Date of Patent: Feb. 12, 2019

(54) SYSTEMS AND METHODS FOR CONTROLLING DC-TO-DC CONVERTERS INCLUDING UNREGULATED OPERATING MODES

(71) Applicant: Volterra Semiconductor LLC, San Jose, CA (US)

(72) Inventors: Sombuddha Chakraborty, Redwood City, CA (US); Jingquan Chen, San Jose, CA (US); Paul H. Choi, San Ramon, CA (US)

(73) Assignee: Volterra Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/670,206

(22) Filed: Aug. 7, 2017

Related U.S. Application Data

(63) Continuation of application No. 14/140,366, filed on Dec. 24, 2013, now Pat. No. 9,729,052.

(51) Int. Cl.
*H02M 3/158* (2006.01)

(52) U.S. Cl.
CPC ................. *H02M 3/158* (2013.01)

(58) Field of Classification Search
CPC .. H02M 3/156; H02M 3/1588; H02M 3/1584; H02M 3/158; H02M 3/157; H02M 3/33507; H02M 2001/0009; H02M 2001/0032; H02M 2001/0012
USPC ................. 323/224, 265–268, 271, 282–285
See application file for complete search history.

(56) References Cited

U.S. PATENT DOCUMENTS

| 6,134,129 | A * | 10/2000 | Keller ............... H02J 1/102 307/58 |
| 6,310,520 | B1 | 10/2001 | Walden |
| 6,965,223 | B1 | 11/2005 | MacLean |
| 7,453,251 | B1 | 11/2008 | Mehas |
| 7,782,038 | B2 * | 8/2010 | Klein ............... H02M 1/36 323/285 |

(Continued)

OTHER PUBLICATIONS

U.S. Appl. No. 14/140,366, Notice of Allowance dated Apr. 14, 2017, 8 pages.

(Continued)

*Primary Examiner* — Kyle J Moody
*Assistant Examiner* — Kevin H Sprenger
(74) *Attorney, Agent, or Firm* — Lathrop Gage LLP (57) ABSTRACT

A method for controlling a DC-to-DC converter includes: (a) regulating a magnitude of an output voltage of the DC-to-DC converter according to a magnitude of a reference voltage; (b) in response to a command to enter the unregulated operating mode, allowing the magnitude of the output voltage to fall; and (c) adjusting the magnitude of the reference voltage to track the magnitude of the output voltage. A controller for a DC-to-DC converter includes reference and switching modules. The reference module generates a reference voltage, such that: (a) a magnitude of the reference voltage is fixed, in a regulated operating mode, and (b) the magnitude of the reference voltage tracks a magnitude of an output voltage of the DC-to-DC converter, in the unregulated operating mode. The switching module controls a power stage of the DC-to-DC converter to regulate the magnitude of the output voltage, in the regulated operating mode.

20 Claims, 6 Drawing Sheets

(56) References Cited

U.S. PATENT DOCUMENTS

| | | | |
|---|---|---|---|
| 7,902,800 B2* | 3/2011 | Jain | H02M 3/1588 323/224 |
| 2004/0041607 A1 | 3/2004 | Pan | |
| 2007/0236192 A1 | 10/2007 | Vo | |
| 2008/0054971 A1 | 3/2008 | Wu | |
| 2008/0157742 A1* | 7/2008 | Martin | H02M 3/1584 323/284 |
| 2009/0174262 A1* | 7/2009 | Martin | H02M 3/157 307/82 |

OTHER PUBLICATIONS

U.S. Appl. No. 14/140,366, Response to Office Action filed Mar. 1, 2017, 14 pages.
U.S. Appl. No. 14/140,366, Office Action dated Dec. 1, 2016, 22 pages.
U.S. Appl. No. 14/140,366, Advisory Action and Interview Summary dated Oct. 28, 2016, 10 pages.
U.S. Appl. No. 14/140,366, Response to Office Action filed Oct. 11, 2016, 14 pages.
U.S. Appl. No. 14/140,366, Office Action dated Aug. 11, 2016, 20 pages.
U.S. Appl. No. 14/140,366, Response to Office Action filed Apr. 1, 2016, 14 pages.
U.S. Appl. No. 14/140,366, Interview Summary dated Mar. 2, 2016, 3 pages.
U.S. Appl. No. 14/140,366, Office Action dated Jan. 6, 2016, 13 pages.

* cited by examiner (PRIOR ART)
*FIG. 1*

SYSTEMS AND METHODS FOR CONTROLLING DC-TO-DC CONVERTERS INCLUDING UNREGULATED OPERATING MODES

RELATED APPLICATIONS

This application is a continuation of U.S. patent application Ser. No. 14/140,366, filed Dec. 24, 2013, which is incorporated herein by reference.

BACKGROUND

DC-to-DC converters are widely used to convert power from one form to another, such as to provide a desired voltage or impedance transformation. Examples of DC-to-DC converters include, but are not limited to, buck-type DC-to-DC converters, boost-type DC-to-DC converters, and buck-boost type DC-to-DC converters. Some DC-to-DC converters include multiple parallel-coupled power stages, or phases, such that the DC-to-DC converters may be referred to as multi-phase DC-to-DC converters. The power stages of multi-phase DC-to-DC converters are typically switched out-of-phase with respect to each other, to achieve ripple current cancellation, high effective switching frequency, and fast transient response.

Figure 1:
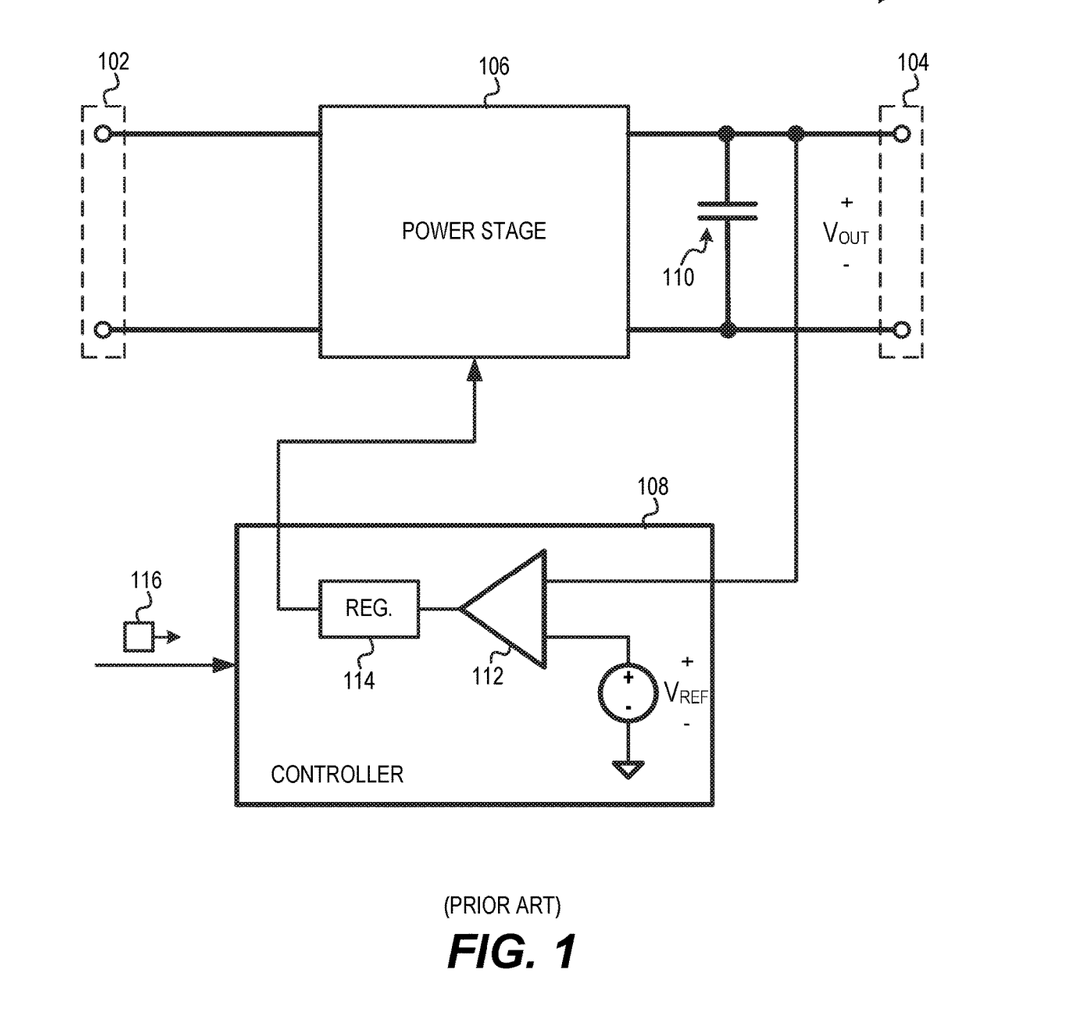
FIG. 1 illustrates a prior art DC-to-DC converter.

DC-to-DC converters commonly regulate their output voltage by causing a magnitude of the output voltage to be substantially equal to a desired reference voltage. For example, FIG. 1 illustrates a prior art DC-to-DC converter 100 including an input port 102, an output port 104, a power stage 106, a controller 108, and an output capacitor 110. Power stage 106 is electrically coupled between input port 102 and output port 104, and output capacitor 110 is electrically coupled across output port 104. A comparison block 112 of controller 108 compares the magnitude of output voltage $V_{OUT}$ to a magnitude of a reference voltage $V_{REF}$. Regulation control circuitry 114 controls power stage 106 such that the magnitude of output voltage $V_{OUT}$ is substantially equal to the magnitude of reference voltage $V_{REF}$.

Some DC-to-DC converters include an unregulated operating mode where output voltage is unregulated. In this operating mode, the output voltage is allowed to fall or decay at a rate governed by discharge of output capacitance, until the output voltage reaches a target voltage. For example, in one embodiment of DC-to-DC converter 100 of FIG. 1, controller 108 shuts down power stage 106 in response to a command 116 to enter an unregulated operating mode, such that output voltage $V_{OUT}$ is allowed to fall until it reaches a target value. The rate at which output voltage $V_{OUT}$ falls during this unregulated operating mode is governed by discharge of output capacitor 110 and any other capacitance electrically coupled across output port 104.

SUMMARY

In an embodiment, a method for controlling a DC-to-DC converter including an unregulated operating mode includes the following steps: (a) regulating a magnitude of an output voltage of the DC-to-DC converter according to a magnitude of a reference voltage; (b) in response to a command to enter the unregulated operating mode, allowing the magnitude of the output voltage to fall; and (c) adjusting the magnitude of the reference voltage to track the magnitude of the output voltage as the magnitude of the output voltage falls.

In an embodiment, a controller for a DC-to-DC converter including an unregulated operating mode includes a reference module and a switching module. The reference module is adapted to generate a reference voltage, such that: (a) a magnitude of the reference voltage is fixed, in a regulated operating mode, and (b) the magnitude of the reference voltage tracks a magnitude of an output voltage of the DC-to-DC converter, in the unregulated operating mode. The switching module is adapted to control a power stage of the DC-to-DC converter to regulate the magnitude of the output voltage according to the magnitude of the reference voltage, in the regulated operating mode.

In an embodiment, a DC-to-DC converter including an unregulated operating mode includes at least one power stage electrically coupled between an input port and an output port and a controller communicatively coupled to the power stage. The controller includes a reference module and a switching module. The reference module is adapted to generate a reference voltage, such that: (a) a magnitude of the reference voltage is fixed, in a regulated operating mode, and (b) the magnitude of the reference voltage tracks a magnitude of an output voltage of the DC-to-DC converter, in the unregulated operating mode. The switching module is adapted to control the power stage of the DC-to-DC converter to regulate the magnitude of the output voltage according to the magnitude of the reference voltage, in the regulated operating mode.

DETAILED DESCRIPTION OF THE EMBODIMENTS

As discussed above, some DC-to-DC converters include an unregulated operating mode where the output voltage is unregulated and is allowed to fall to a target value before output voltage regulation resumes. Applicants have determined that it may be difficult to quickly resume regulation from the unregulated operating mode, in some situations. Specifically, if the reference voltage magnitude differs significantly from the output voltage magnitude when transitioning from the unregulated operating mode to a regulated operating mode, controller circuitry having a limited dynamic range may saturate, potentially delaying output voltage regulation and causing output voltage overshoot or undershoot.

Applicants have discovered, however, that such problems can be reduced, or even essentially eliminated, by adjusting the reference voltage magnitude to track the output voltage magnitude, in the unregulated operating mode. In particular, adjusting the reference voltage magnitude to track the output voltage magnitude causes a difference between these two voltages to be relatively small, thereby reducing the likelihood of controller circuitry saturation during a transition from the unregulated operating mode to a regulated operating mode.

Figure 2:
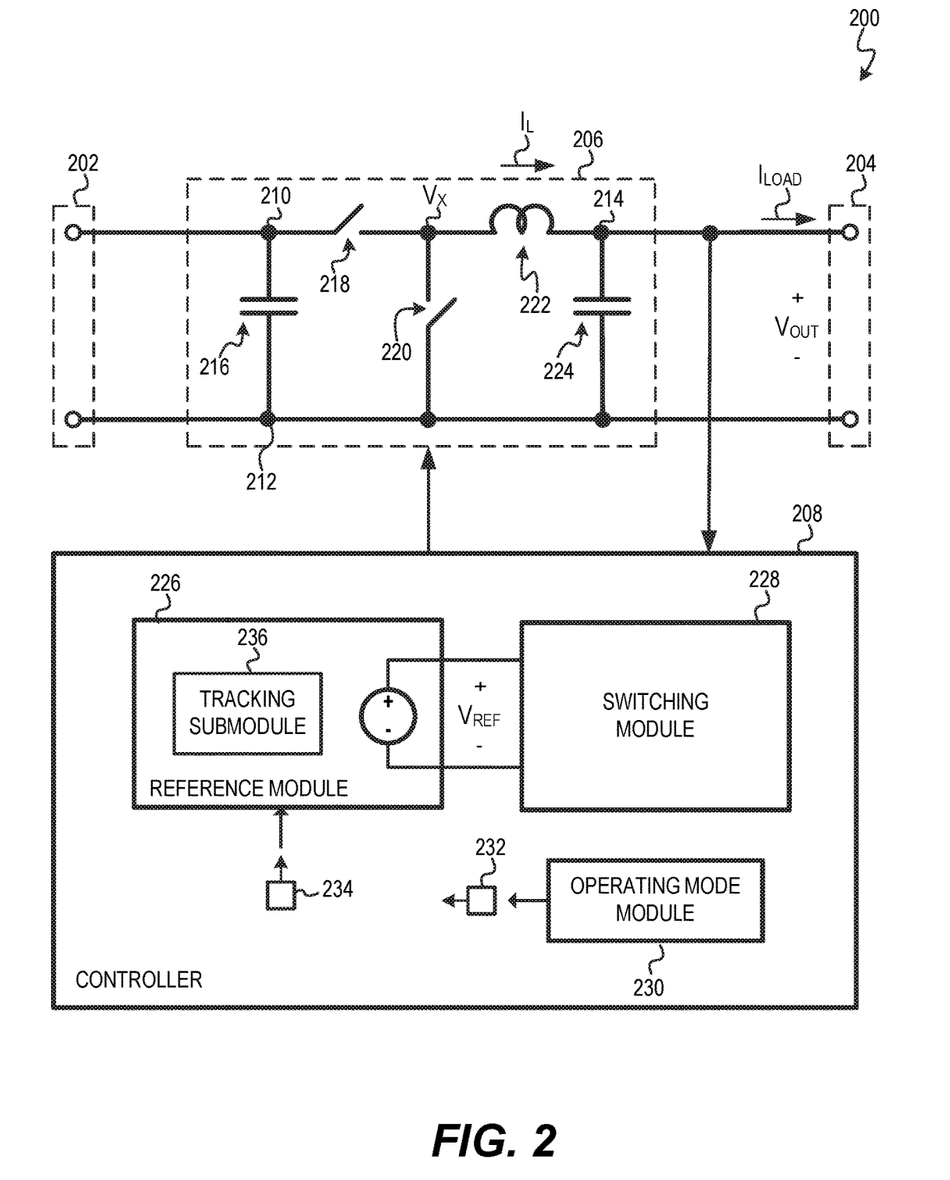
FIG. 2 illustrates a DC-to-DC converter including an unregulated operating mode, according to an embodiment.

FIG. 2 illustrates a DC-to-DC converter 200 where reference voltage magnitude tracks output voltage magnitude in an unregulated operating mode. DC-to-DC converter 200 includes an input port 202, an output port 204, a power stage 206, and a controller 208 communicatively coupled to power stage 206. Input port 202 is electrically coupled between a positive input node 210 and a reference node 212, and output port 204 is electrically coupled between an output node 214 and reference node 212.

Power stage 206 has a buck-type topology and is electrically coupled between input port 202 and output port 204. Power stage 206 includes an input capacitor 216, a control switching device 218, a freewheeling switching device 220, an inductor 222, and an output capacitor 224. Control switching device 218 and freewheeling switching device 220 are, for example, transistors. Input capacitor 216 is electrically coupled between positive input node 210 and reference node 212, and input capacitor 216 at least partially supplies AC current required by power stage 206. Output capacitor 224 is electrically coupled between output node 214 and reference node 212, and output capacitor 224 absorbs ripple current generated by switching of power stage 206. Output capacitor 224 also at least partially supplies high frequency components of load current $I_{LOAD}$ in some embodiments. Control switching device 218 is electrically coupled between positive input node 210 and a switching node $V_x$, and freewheeling switching device 220 is electrically coupled between switching node $V_x$ and reference node 212. Inductor 222 is electrically coupled between switching node $V_x$ and output node 214. In some alternate embodiments, the positions of control switching device 218 and freewheeling switching device 220 are swapped, such that power stage 206 has an inverted buck-type topology. Freewheeling switching device 220 is replaced with, or supplemented by, a diode in certain alternate embodiments.

Controller 208, which controls operation of power stage 206, includes a reference module 226, a switching module 228, and an operating mode module 230. Controller 208 supports at least a first regulated operating mode, a second regulated operating mode, and the unregulated operating mode, of DC-to-DC converter 200. Controller 208 is adapted to change from the first regulated operating mode to the unregulated operating mode, and then from the unregulated operating mode to the second regulated operating mode, such that the unregulated operating mode is a transitional operating mode between the first and second regulated operating modes. Controller 208 is also adapted to change from the second regulated operating mode to the first regulated operating mode. Although not required, it is anticipated that the first and second regulated operating modes will be used under heavy and light load conditions, respectively. Controller 208 transitions between operating modes in response to commands 232 generated by operating mode module 230.

In the first regulated operating mode, controller 208 controls power stage 206 to regulate a magnitude of an output voltage $V_{OUT}$ across output port 204, according to a magnitude of a reference voltage $V_{REF}$. Specifically, reference module 226 generates a reference voltage $V_{REF}$ having a fixed magnitude, and switching module 228 causes control switching device 218 to repeatedly switch between its conductive and non-conductive states, typically at a frequency of at least 50 kilohertz, to transfer power between input port 202 and output port 204. In some embodiments, switching module 228 controls power stage 206 using a pulse width modulation (PWM) or a pulse frequency modulation (PFM) technique. For example, in some embodiments, switching module 228 generates an error signal proportional to a difference between output voltage $V_{OUT}$ and reference voltage $V_{REF}$, and switching module 228 controls a duty of cycle of control switching device 218 to minimize the error signal's magnitude, thereby regulating the magnitude of output voltage $V_{OUT}$ according to the magnitude of reference voltage $V_{REF}$. Switching module 228 also causes freewheeling switching device 220 to repeatedly switch between its conductive and non-conductive states such that freewheeling switching device 220 performs a freewheeling function, or in other words, such that freewheeling switching device 220 provides a path for inductor current $I_L$ when control switching device 218 switches from its conductive to its non-conductive state.

In some embodiments, switching module 228 controls power stage 206 in the first regulated operating mode such that output voltage $V_{OUT}$ magnitude is substantially equal to the magnitude of reference voltage $V_{REF}$. In some other embodiments, switching module 228 controls power stage 206 to regulate the magnitude of output voltage $V_{OUT}$ such that it has a predetermined relationship to the magnitude of reference voltage $V_{REF}$. For example, in a particular embodiment, switching module 228 controls power stage 206 to regulate the magnitude of output voltage $V_{OUT}$ such that it is proportional to, but different from, the magnitude of reference voltage $V_{REF}$.

In certain embodiments, the magnitude of reference voltage $V_{REF}$ is programmable by a voltage command signal 234 in the first regulated operating mode, such as to allow the magnitude of output voltage $V_{OUT}$ to be adjusted according to the requirements of a load (not shown) electrically coupled to output port 204. For example, in applications where DC-to-DC converter 200 powers a microprocessor, it may be necessary to vary the magnitude of output voltage $V_{OUT}$ according to the microprocessor's operating state. Voltage command signal 234 could be generated external to controller 208, such as by circuitry in a load (not shown) electrically coupled to output port 204. Alternately, controller 208 could further include an optional module (not shown) for generating voltage command signal 234.

In response to a command 232 to change from the first regulated operating mode to the unregulated operating mode, switching module 228 causes power stage 206 to cease transferring power between input port 202 and output port 204, to allow the magnitude of output voltage $V_{OUT}$ to fall. Specifically, in the unregulated operating mode, switching module 228 causes control switching device 218 and freewheeling switching device 220 to each continuously operate in their non-conductive states, so that power stage 206 is effectively shut down and does not transfer power between input port 202 and output port 204. Thus, the magnitude of output voltage $V_{OUT}$ is unregulated and falls as capacitance between output node 214 and reference node 212 is discharged by load current and/or leakage current.

Once the magnitude of output voltage $V_{OUT}$ falls to a target value associated with the second regulated operating mode, operating mode module 230 generates a command 232 to change from the unregulated operating mode to the second regulated operating mode. Reference module 226 maintains the magnitude of reference voltage $V_{REF}$ at the target value in the second regulated operating mode. Switching module 228 also resumes controlling power stage 206 to regulate the magnitude of output voltage $V_{OUT}$ according to the magnitude of reference voltage $V_{REF}$, in a manner similar to that of the first regulated operating mode.

For example, if the magnitude of output voltage $V_{OUT}$ is 2.00 volts when controller 208 enters the first regulated operating mode, and if the target value associated with the second operating mode is 1.90 volts, controller 208 causes switching devices 218, 220 to continuously operate in their non-conductive states, such that the magnitude of output voltage $V_{OUT}$ falls from 2.00 volts to 1.90 volts. Once the magnitude of output voltage $V_{OUT}$ has fallen to 1.90 volts, controller 208 enters the second regulated operating mode, where reference module 226 maintains the magnitude of reference voltage $V_{REF}$ at 1.90 volts, and where switching module 228 regulates the magnitude of output voltage $V_{OUT}$ according to the magnitude of the reference voltage.

Reference module 226 includes a tracking submodule 236 which adjusts the magnitude of reference voltage $V_{REF}$ to track the magnitude of output voltage $V_{OUT}$, in the unregulated operating mode. Tracking submodule 236, however, is inactive in the first and second regulated operating modes, since reference voltage $V_{REF}$ has a fixed magnitude in the first and second regulated operating modes. In some embodiments, tracking submodule 236 linearly varies the magnitude of reference voltage $V_{REF}$ in the unregulated operating mode, so that the magnitude of reference voltage $V_{REF}$ is substantially identical to output voltage $V_{OUT}$. In some other embodiments, tracking submodule 236 varies the magnitude of reference voltage $V_{REF}$ in a step-wise manner in the unregulated operating mode, such that the magnitude of $V_{REF}$ approximates the magnitude of output voltage $V_{OUT}$.

Figure 3:
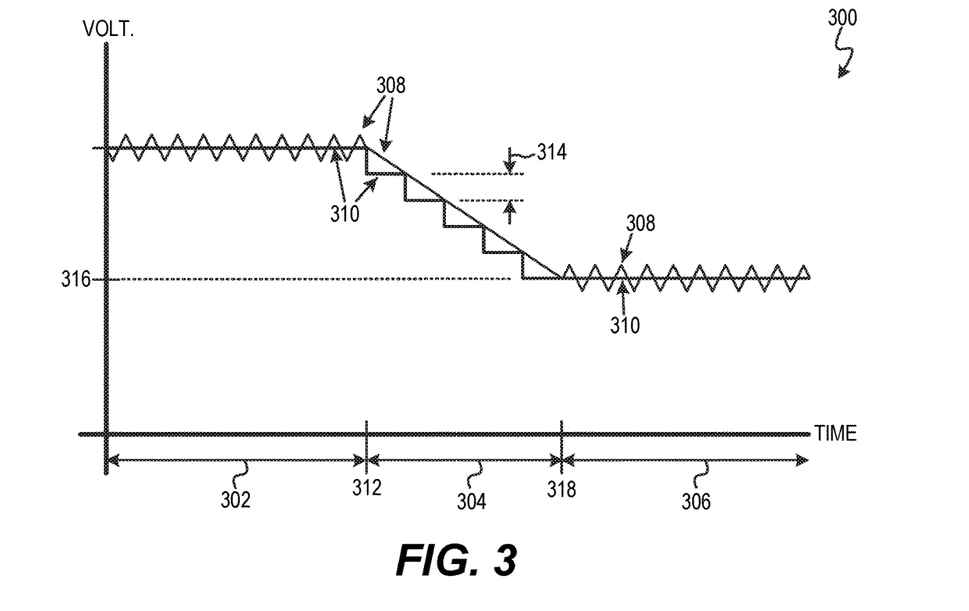
FIG. 3 illustrates an example of reference and output voltage magnitudes during a transition between operating modes, in one embodiment of the FIG. 2 DC-to-DC converter.

For example, FIG. 3 shows a graph 300 illustrating an example of reference and output voltage magnitudes during a change from the first regulated operating mode to the unregulated operating mode, and then from the unregulated operating mode to the second regulated operating mode. The vertical axis of graph 300 represents voltage magnitude, and the horizontal axis of graph 300 represents time. Time period 302 corresponds to operation in the first regulated operating mode, time period 304 corresponds to operation in the unregulated operating mode, and time period 306 corresponds to operation in the second regulated operating mode. Curve 308 represents output voltage $V_{OUT}$, and curve 310 represents reference voltage $V_{REF}$. At time 312, controller 208 changes from the first regulated operating mode to the unregulated operating mode, and tracking submodule 236 decreases the magnitude of reference voltage $V_{REF}$ by a predetermined amount, such as 30 millivolts. Tracking submodule 236 then monitors output voltage $V_{OUT}$ and further decreases the magnitude of reference voltage $V_{REF}$ by a predetermined amount 314 each time the magnitude of output voltage $V_{OUT}$ is equal to the magnitude of reference voltage $V_{REF}$, so that $V_{REF}$ tracks output voltage $V_{OUT}$ in a step-wise manner. When the magnitude of output voltage $V_{OUT}$ equals a target value 316 at time 318, controller 208 changes from the unregulated operating mode to the second regulated operating mode. Reference module 226 maintains the magnitude of reference voltage $V_{REF}$ at target value 316, and switching module 228 controls power stage 206 to regulate the magnitude of output voltage $V_{OUT}$ according to the magnitude of reference voltage $V_{REF}$, in the second regulated operating mode.

Figure 4:
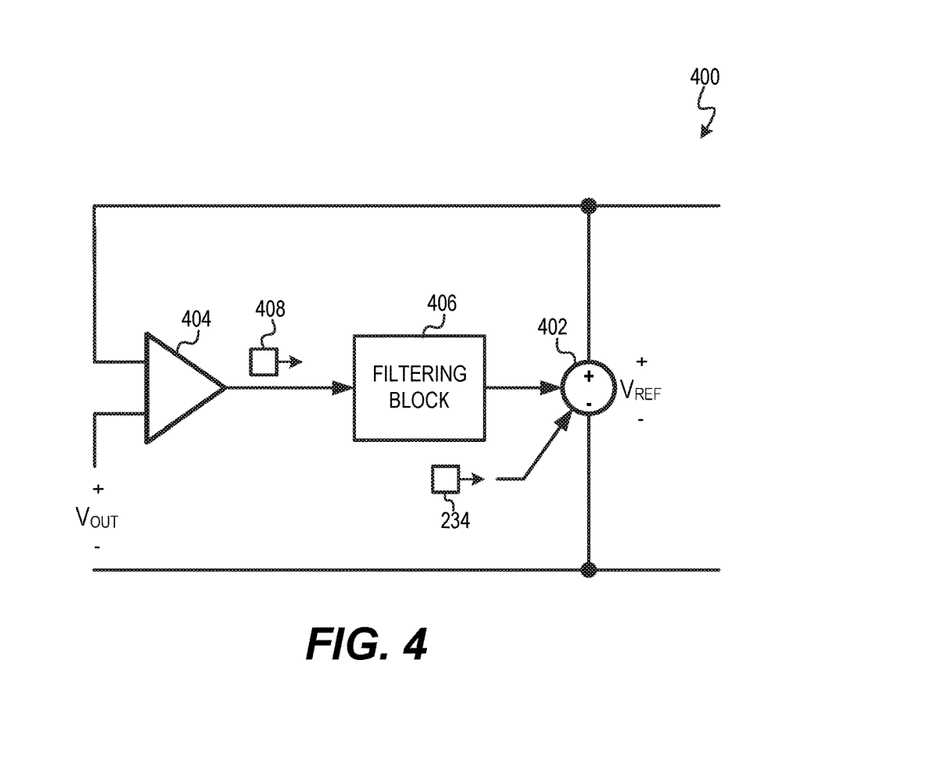
FIG. 4 illustrates one possible implementation of a reference module of the FIG. 2 DC-to-DC converter.

FIG. 4 illustrates a reference module 400, which is one possible implementation of reference module 226 of FIG. 2. Reference module 400 includes a voltage generator 402, a comparison block 404, and an optional filtering block 406. Voltage generator 402 generates reference voltage $V_{REF}$ having a magnitude commanded by voltage control signal 234, in the first and second regulated operating modes. In the unregulated operating mode, comparison block 404 compares output voltage $V_{OUT}$ to reference voltage $V_{REF}$, and comparison block 404 asserts a signal 408 each time the magnitude of output voltage $V_{OUT}$ equals the magnitude of reference voltage $V_{REF}$. Voltage generator 402 decreases the magnitude of reference voltage $V_{REF}$ by a predetermined amount, such as 30 millivolts, each time signal 408 is asserted. Optional filtering block 406 limits how frequently signal 408 is communicatively coupled to voltage generator 402, to limit the slew rate of reference voltage $V_{REF}$ in the unregulated operating mode.

In embodiments where tracking submodule 236 varies the magnitude of reference voltage $V_{REF}$ in step-wise manner in the unregulated operating mode, the magnitude of reference voltage $V_{REF}$ may be driven below the target value associated with the second regulated operating mode, since reference voltage $V_{REF}$ granularity is limited by step size. Such result is undesirable because it may cause output voltage $V_{OUT}$ undershoot when changing from the unregulated operating mode to the second regulated operating mode. Accordingly, in some embodiments, controller 208 does not directly change from the unregulated operating mode to the second regulated operating mode, but instead enters a slew operating mode between the unregulated and second regulated operating modes. Slew mode operation enables reference module 226 to gradually reduce the magnitude of reference voltage $V_{REF}$ when it is close to the target value, thereby helping prevent it from falling below the target value. In embodiments supporting the slew operating mode, controller 208 changes from the unregulated operating mode to the slew operating mode when the magnitude of reference voltage $V_{REF}$ is within a predetermined proximity, such as 60 millivolts, to the target value associated with the second regulated operating mode.

The slew operating mode is characterized by reference module 226 decreasing the magnitude of reference voltage $V_{REF}$ at a predetermined slew rate, such as 3 millivolts per microsecond, and switching module 228 regulating the magnitude of output voltage $V_{OUT}$ according to reference voltage $V_{REF}$ magnitude. In some embodiments, switching module 228 regulates the magnitude of output voltage $V_{OUT}$ in the slew operating mode such that the magnitude of output voltage $V_{OUT}$ is substantially equal to the magnitude of reference voltage $V_{REF}$. In some other embodiments, switching module 228 regulates magnitude of output voltage $V_{OUT}$ in the slew operating mode such that it has a predetermined relationship to the magnitude of reference voltage $V_{REF}$. Reference module 226 decreases the magnitude of reference voltage $V_{REF}$ in a linear or step-wise manner, for example, in the slew operating mode.

Figure 5:
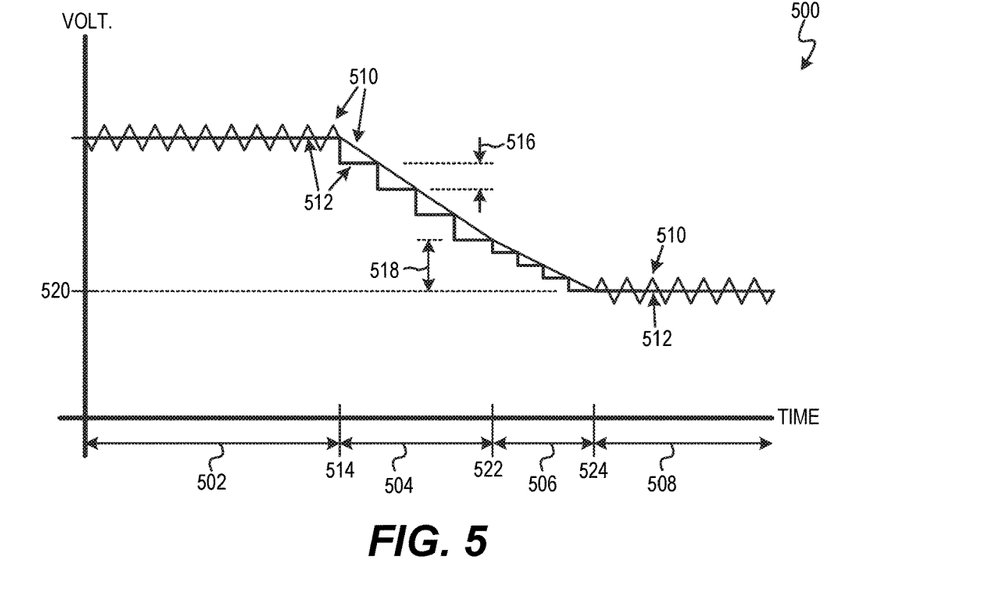
FIG. 5 illustrates an example of reference and output voltage magnitudes during a transition between operating modes, in another embodiment of the FIG. 2 DC-to-DC converter.

For example, FIG. 5 shows a graph 500 illustrating an example of reference and output voltage magnitudes during operating mode changes, in one embodiment supporting the slew operating mode. The vertical axis of graph 500 represents voltage magnitude, and the horizontal axis of graph 500 represents time. Time period 502 corresponds to operation in the first regulated operating mode, time period 504 corresponds to operation in the unregulated operating mode, time period 506 corresponds to operation in the slew operating mode, and time period 508 corresponds to operation in its second regulated operating mode. Curve 510 corresponds to output voltage $\mathrm{V}_{OUT}$, and curve 512 corresponds to reference voltage $V_{REF}$. At time 514, controller 208 changes from the first regulated operating mode to the unregulated operating mode, and tracking submodule 236 decreases the magnitude of reference voltage $V_{REF}$ by a predetermined amount, such as 30 millivolts. Tracking submodule 236 then monitors output voltage $V_{OUT}$ and further decreases the magnitude of reference voltage $V_{REF}$ by a first predetermined amount 516 each time the magnitude of output voltage $V_{OUT}$ is equal to $V_{REF}$, so that $V_{REF}$ tracks output voltage $V_{OUT}$ in a step-wise manner, in the unregulated operating mode.

When the magnitude of output voltage $V_{OUT}$ is within a predetermined proximity 518 to a target value 520 associated with the second regulated operating mode at time 522, controller 208 changes from the unregulated operating mode to the slew operating mode, and reference module 226 decreases the magnitude of reference voltage $V_{REF}$ at a predetermined slew rate, until the magnitude of reference voltage $V_{REF}$ is equal to target value 520 at time 524. Controller 208 then changes from the slew operating mode to the second regulated operating mode, and switching module 228 regulates the magnitude of output voltage $V_{OUT}$ according to the magnitude of reference voltage $V_{REF}$. Reference module 226 keeps the magnitude of reference voltage $V_{REF}$ constant at target value 520, in the second regulated operating mode.

DC-to-DC converter 200 may change from the second regulated operating mode back to the first regulated operating mode, such as in response to a change in load power requirements. In some embodiments, reference module 226 changes the magnitude of reference voltage $V_{REF}$ according to a predetermined slew rate when controller 208 changes from the second to the first regulated operating mode, to help prevent control circuitry saturation and associated output voltage $V_{OUT}$ undershoot or overshoot, which may otherwise result from an uncontrolled change in reference voltage $V_{REF}$ magnitude.

Additionally, controller 208 is optionally capable of changing from the unregulated operating mode back to the first regulated operating mode, such as if load power requirements suddenly change. In some embodiments supporting such transition, reference module 226 changes the magnitude of reference voltage $V_{REF}$ to a new target value associated with the first regulated operating mode at a predetermined slew rate, to help prevent control circuitry saturation. In some other embodiments, reference module 226 changes the magnitude of reference voltage $V_{REF}$ at a variable slew rate that is reduced during the operating mode transition, to speed the transition while helping prevent overshoot of reference voltage $V_{REF}$. In some embodiments, the slew rate is decreased in a linear manner, while in some other embodiments, the slew rate is decreased in a step-wise manner. For example, in a particular embodiment, reference module 226 increases the magnitude of reference voltage $V_{REF}$ at a first predetermined slew rate until the magnitude of reference voltage $V_{REF}$ reaches a threshold value, and reference module 226 then increases the magnitude of reference voltage $V_{REF}$ at a second predetermined slew rate until a new target value is reached, where the first predetermined slew rate is greater than the second predetermined slew rate.

Figure 6:
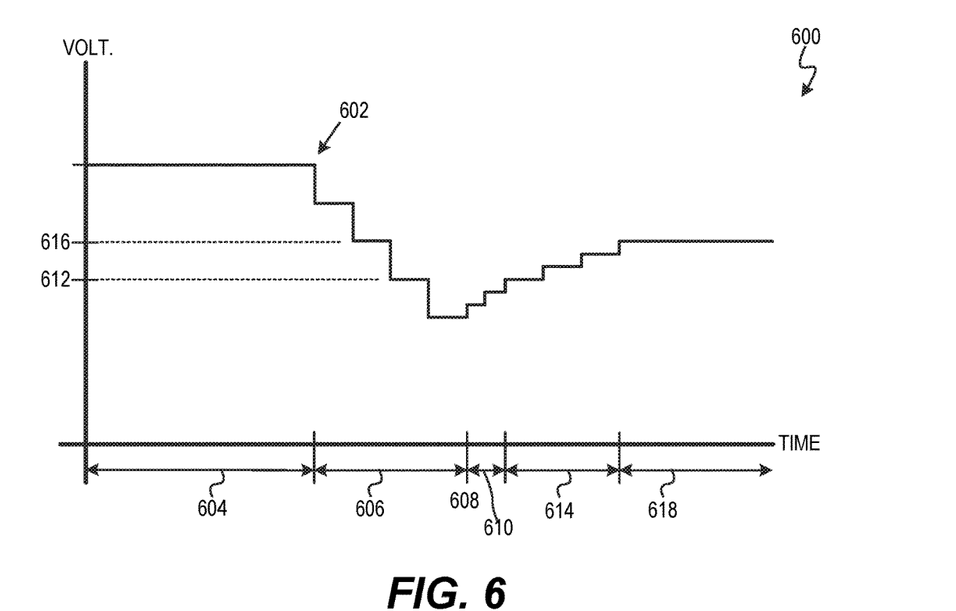
FIG. 6 illustrates an example of reference voltage magnitude in one particular embodiment of the FIG. 2 DC-to-DC converter during a transition from the unregulated operating mode to a regulated operating mode.

For example, FIG. 6 shows a graph 600 illustrating an example of reference voltage magnitude in one particular embodiment of DC-to-DC converter 200 changing from its unregulated operating mode back to its first regulated operating mode. The vertical axis of graph 600 represents voltage, and the horizontal axis of graph 600 represents time. Curve 602 represents reference voltage $V_{REF}$. During time period 604, controller 208 is operating in the first regulated operating mode. In time period 606, controller 208 is operating in the unregulated operating mode, and tracking submodule 236 reduces the magnitude of reference voltage $V_{REF}$ in a step-wise manner. At time 608, controller 208 changes back to the first regulated operating mode. Accordingly, reference module 226 increases the magnitude of reference voltage $V_{REF}$ at a first predetermined slew rate during time period 610, until the magnitude of reference voltage $V_{REF}$ reaches a threshold value 612. After the magnitude of reference voltage $V_{REF}$ reaches threshold value 612, reference module 226 increases the magnitude of reference voltage $V_{REF}$ at a second predetermined slew rate during time period 614, until the magnitude of reference voltage $V_{REF}$ reaches a new target value 616. The first predetermined slew rate of time period 610 is greater than the second predetermined slew rate of time period 614. In time period 618, reference module generates reference voltage $V_{REF}$ having a magnitude equal to the new target value 616.

Figure 7:
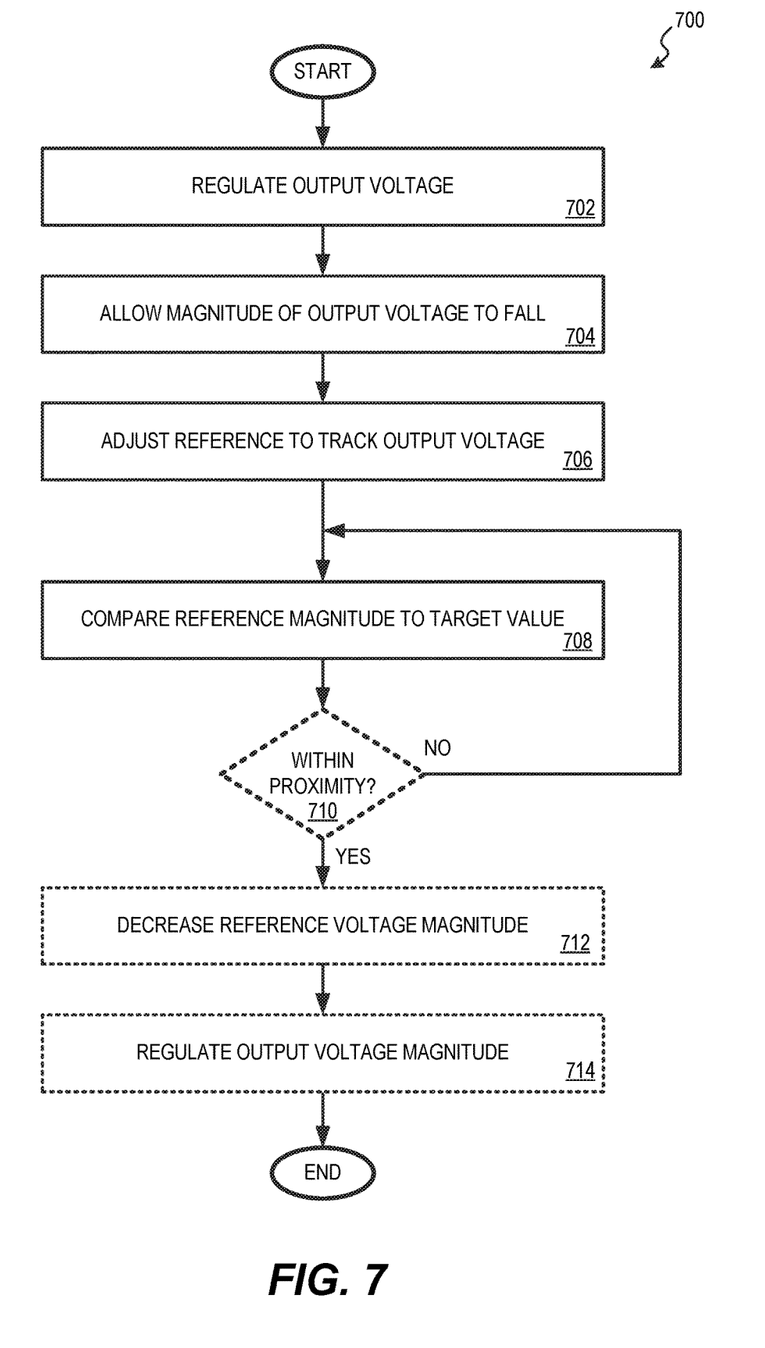
FIG. 7 illustrates a method for controlling a DC-to-DC converter including an unregulated operating mode, according to an embodiment.

FIG. 7 illustrates a method 700 for controlling a DC-to-DC converter including an unregulated operating mode. Although method 700 is discussed below in conjunction with DC-to-DC converter 200 of FIG. 2, it should be appreciated that method 700 is not limited to use with DC-to-DC converter 200. Additionally, DC-to-DC converter 200 could be controlled using a method other than that of FIG. 7.

Method 700 begins with a step 702 of regulating an output voltage of the DC-to-DC converter according to a magnitude of a reference voltage. One example of step 702 is controller 208 operating in the first regulated operating mode where reference module 226 generates reference voltage $V_{REF}$ having a constant magnitude, and switching module 228 regulates the magnitude of output voltage $V_{OUT}$ according to the magnitude of reference voltage $V_{REF}$ (see FIG. 2). In step 704, the magnitude of the output voltage is allowed to fall, in response to a command to enter an unregulated operating mode. In one example of step 704, switching module 228 causes switching devices 218, 220 to continuously operate in their non-conductive states, in response to a command 232 to change to the unregulated operating mode. In step 706, the magnitude of the reference voltage is adjusted to track the magnitude of the output voltage as the magnitude of the output voltage falls. In one example of step 706, tracking submodule 236 adjusts the magnitude of reference voltage $V_{REF}$ in a step-wise manner, such as in a manner similar to that illustrated in FIG. 3, to track the magnitude of output voltage $V_{OUT}$.

Method 700 optionally further includes steps 708-714. In step 708, the magnitude of the reference voltage is compared to a target value. In one example of step 708, operating mode module 230 compares the magnitude of reference voltage $V_{REF}$ to a target value associated with the second regulated operating mode. Decision step 710 determines whether the magnitude of reference voltage $V_{REF}$ is within a predetermined proximity to the target value. If so, operation proceeds to step 712; if not, steps 708 and 710 repeat. In one example of step 710, operating mode module 230 determines that the magnitude of reference voltage $V_{REF}$ is within predetermined proximity 518 to target value 520 (see FIG. 5), and operating mode module 230 generates a command 232 to change from the unregulated operating mode to the slew operating mode. In step 712, the magnitude of the reference voltage is decreased at a predetermined slew rate until the magnitude of the reference voltage reaches the target value. In one example of step 712, reference module 226 decreases the magnitude of reference voltage $V_{REF}$ in the slew operating mode until it reaches target value 520. In step 714, the magnitude of the output voltage is regulated according to the reference voltage $V_{REF}$'s magnitude while the magnitude of the reference voltage is decreased. In one example of step 714, switching module 228 regulates the magnitude of output voltage $V_{OUT}$ during the slew operating mode.

As discussed above, operating mode module 230 generates commands 232 to cause controller 208 to change between operating modes. In some embodiments, operating mode module 230 also determines when operating mode changes are required. For example, in certain embodiments supporting the slew operating mode, operating mode module 230 compares the magnitude of reference voltage $V_{REF}$ to a target value, while controller 208 operates in the unregulated operating mode. When operating mode module 230 determines that the reference voltage $V_{REF}$ magnitude is within a predetermined proximity to the target value, operating mode module 230 then generates a command 232 to change from the unregulated operating mode to the slew operating mode. In some alternate embodiments, operating mode module 230 is omitted, and commands 232 are received from outside controller 208, such as by a system hosting DC-to-DC converter 200.

Although power stage 206 is illustrated as having a single-phase buck-type topology, power stage 206 could have an alternative topology, such as a boost-type topology or a buck-boost-type topology, without departing from the scope hereof. Additionally, power stage 206 could alternately have a multi-phase topology, such as a multi-phase buck topology, a multi-phase boost topology, or a multi-phase buck-boost topology. Furthermore, power stage 206 is not limited to having a switching converter topology but could instead have a linear regulator topology.

Figure 8:
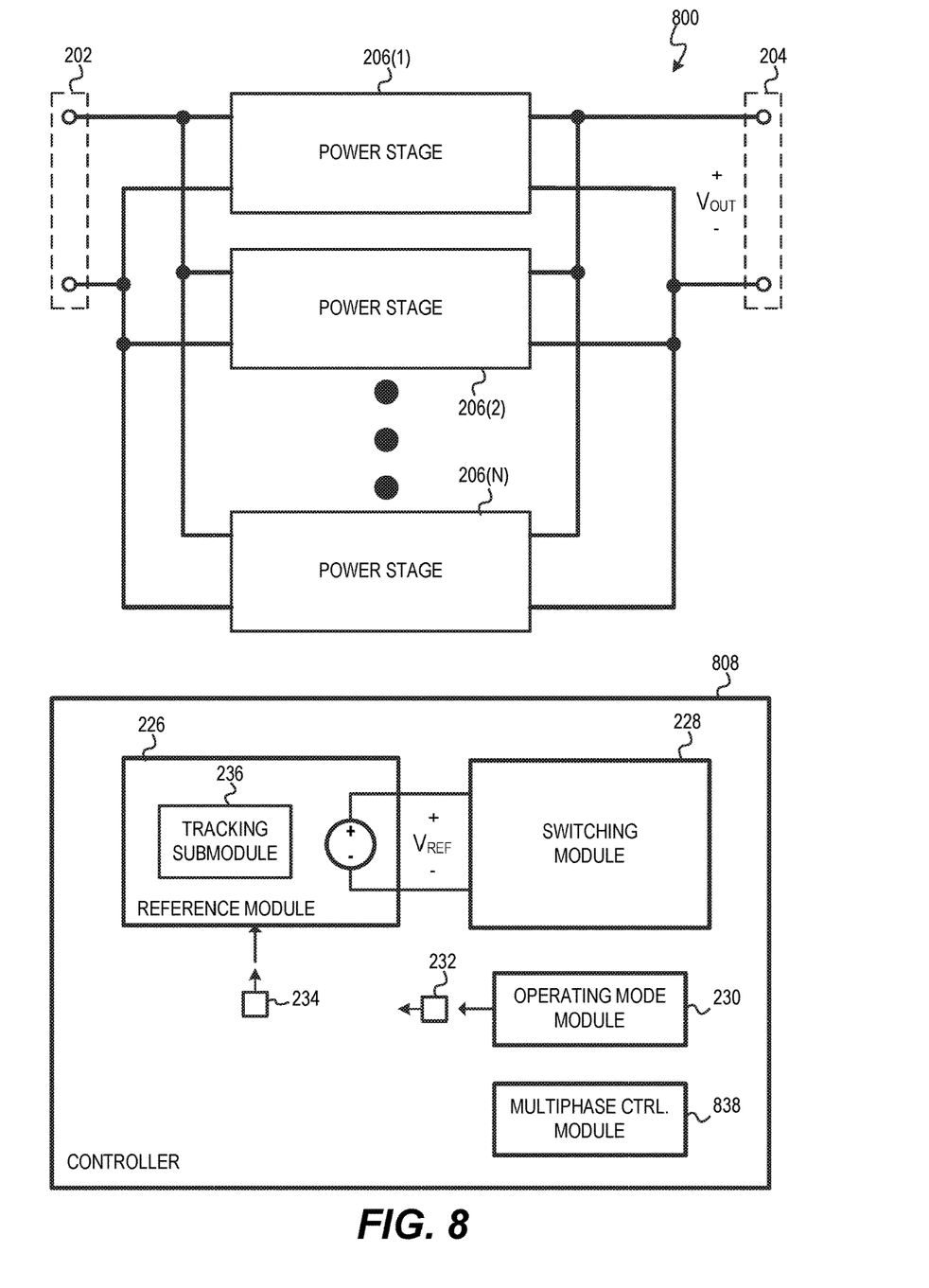
FIG. 8 illustrates a DC-to-DC converter which is similar to the FIG. 2 DC-to-DC converter, but including a plurality of power stages electrically coupled in parallel, according to an embodiment.

For example, FIG. 8 illustrates a DC-to-DC converter 800, which is similar to DC-to-DC converter 200 of FIG. 2, but where single power stage 206 has been replaced with N instances of power stage 206 electrically coupled in parallel, where N is an integer greater than one, to form an N-phase buck-type converter. In this document, specific instances of an item may be referred to by use of a numeral in parentheses (e.g., power stage 206(1)) while numerals without parentheses refer to any such item (e.g., power stages 206). Details of power stages 206 are not shown in FIG. 8 to promote illustrative clarity. Controller 208 of DC-to-DC converter 200 is also replaced with a controller 808, where controller 808 is similar to controller 208 of FIG. 2, but further includes a multi-phase control module 838, which coordinates control of the N power stages 206, such that the power stages switch out-of-phase with respect other. Controller 808 supports first and second regulated operating modes, and an unregulated operating mode, in a manner similar to that of controller 208. Some embodiments of controller 808 also support the slew operating mode in a manner similar to that of controller 208. In certain alternate embodiments, two or more power stages 206 share a common coupled inductor, in place of discrete inductors 222. Connections between controller 808 and power stages 206 are not shown to promote illustrative clarity.

As discussed above, while not required, it is anticipated that the first regulated operating mode is used with heavy load conditions and the second regulated operating mode is used with light load conditions. Accordingly, in some embodiments, multi-phase control module 838 controls how many of the N power stages 206 are operating, i.e., transferring power between input port 202 and output port 204, according to operating mode. For example, in a particular embodiment, multi-phase control module 838 cause all, or the majority, of the N power stages 206 to operate in the first regulated operating mode, so that DC-to-DC converter 800 can support large load current magnitude. In this particular embodiment, multi-phase control module 838 also causes less than N, such as only one, of the N power stages to operate in the second regulated operating mode and in the slew operating mode (if supported), to promote light load efficiency. As known in the art of multi-phase DC-to-DC converters, light load efficiency can often be increased by "shedding" power stages, i.e., by reducing the number of power stages that are operating.

In some applications, load current magnitude may increase after operating mode module 230, or an external system, has determined that a transition from the first regulated operating mode to the second regulated operating mode is required. For example, load current magnitude may increase during the unregulated operating mode. The load current magnitude increase may be large enough so that most or all of the N power stages 206 must operate during the slew operating mode to adequately support the load. Accordingly, in some embodiments, multi-phase control module 838 is adapted to control how many of the N power stages 206 are operating during the slew operating mode according to DC-to-DC converter 800's load current magnitude. For instance, in a particular embodiment, multi-phase control module 838 causes only one of the N power stages 206 to operate in the slew operating mode if load current magnitude is below a predetermined threshold value, and multi-phase control module 838 causes all of the N power stages to operate in the slew operating mode if load current magnitude is equal to, or exceeds, the predetermined threshold value. The predetermined threshold value, for example, is a smallest load current magnitude at which more than one of the N power stages 206 must operate to adequately support the load current.

Although functionality of controllers 208 and 808 is illustrated as being distributed among various modules, one or more of the modules of either controller could be combined or subdivided. Additionally, functionality of controllers 208 and 808 could be distributed among modules in a different manner, without departing from the scope hereof. Controllers 208 and 808 are implemented, for example, by a combination of digital and analog circuitry. In some embodiments, controllers 208 and 808 are at least partially implemented by a processor executing instructions in the form of software or firmware.

Combinations of Features

Features described above as well as those claimed below may be combined in various ways without departing from the scope hereof. The following examples illustrate some possible combinations:

(A1) A method for controlling a DC-to-DC converter including an unregulated operating mode may include: (1) regulating a magnitude of an output voltage of the DC-to-DC converter according to a magnitude of a reference voltage; (2) in response to a command to enter the unregulated operating mode, allowing the magnitude of the output voltage to fall; and (3) adjusting the magnitude of the reference voltage to track the magnitude of the output voltage as the magnitude of the output voltage falls.

(A2) In the method denoted as (A1), the step of adjusting the magnitude of the reference voltage to track the magnitude of the output voltage may include adjusting the magnitude of the reference voltage in a step-wise manner.

(A3) In the method denoted as (A2), the step of adjusting the magnitude of the reference voltage to track the magnitude of the output voltage may further include (1) comparing the magnitude of the output voltage to the magnitude of the reference voltage; and (2) decreasing the magnitude of the reference voltage by a predetermined amount in response to the magnitude of the output voltage being equal to the magnitude of the reference voltage.

(A4) Any of the methods denoted as (A1) through (A3) may further include: (1) comparing the magnitude of the reference voltage to a target value; and (2) in response to the magnitude of the reference voltage being within a predetermined proximity to the target value, operating in a slew operating mode, the slew operating mode including: (a) decreasing the magnitude of the reference voltage at a predetermined slew rate until the magnitude of the reference voltage reaches the target value, and (b) regulating the magnitude of the output voltage according to the magnitude of reference voltage while decreasing the magnitude of the reference voltage at the predetermined slew rate.

(A5) The method denoted as (A4) may further include, in response to a command to change to a different operating mode, changing the magnitude of the reference voltage from the target value to a new value.

(A6) In either of the methods denoted as (A4) or (A5), the slew operating mode may further include controlling how many power stages of the DC-to-DC converter are operating according to a magnitude of a load current of the DC-to-DC converter.

(A7) Any of the methods denoted as (A1) through (A6) may further include, in response to a command to change to a different operating mode: (1) increasing the magnitude of the reference voltage at a first predetermined slew rate until the magnitude of the reference voltage reaches a threshold value; and (2) increasing the magnitude of the reference voltage at a second predetermined slew rate after the magnitude of the reference voltage reaches the threshold value, the first predetermined slew rate being greater than the second predetermined slew rate.

(A8) In any of the methods denoted as (A1) through (A7): (1) the step of regulating the magnitude of the output voltage of the DC-to-DC converter according to the magnitude of the reference voltage may include transferring power between an input port of the DC-to-DC converter and an output port of the DC-to-DC converter; and (2) the step of allowing the magnitude of the output voltage to fall may include ceasing transfer of power between the input port and the output port.

(A9) In the method denoted as (A8): (1) the DC-to-DC converter may include at least one switching device; (2) the step of regulating the magnitude of the output voltage according to the magnitude the reference voltage may include repeatedly switching the at least one switching device between its conductive and non-conductive states; and (3) the step of allowing the magnitude of the output voltage to fall may include continuously operating the at least one switching device in its non-conductive state.

(A10) In any of the methods denoted as (A1) through (A9), the step of regulating the magnitude of the output voltage according to the magnitude the reference voltage may include regulating the magnitude of the output voltage such that the magnitude of the output voltage is substantially equal to the magnitude of the reference voltage.

(A11) In any of the methods denoted as (A1) through (A9), the step of regulating the magnitude of the output voltage according to the magnitude the reference voltage may include regulating the magnitude of the output voltage such that the magnitude of the output voltage has a predetermined relationship to the magnitude of the reference voltage.

(B1) A controller for a DC-to-DC converter including an unregulated operating mode may include: (1) a reference module adapted to generate a reference voltage, such that: (a) a magnitude of the reference voltage is fixed, in a regulated operating mode, and (b) the magnitude of the reference voltage tracks a magnitude of an output voltage of the DC-to-DC converter, in the unregulated operating mode; and (2) a switching module adapted to control a power stage of the DC-to-DC converter to regulate the magnitude of the output voltage according to the magnitude of the reference voltage, in the regulated operating mode.

(B2) In the controller denoted as (B1), the switching module may be further adapted to control the power stage such the magnitude of the output voltage is allowed to fall, in the unregulated operating mode.

(B3) In either of the controllers denoted as (B1) or (B2), the reference module may be further adapted to, in the unregulated operating mode: (1) compare the magnitude of the output voltage to the magnitude of the reference voltage; and (2) decrease the magnitude of the reference voltage by a predetermined amount in response to the magnitude of the output voltage being equal to the magnitude of the reference voltage.

(B4) Any of the controllers denoted as (B1) through (B3) may further include an operating mode module adapted to change the controller from the unregulated operating mode to a slew operating mode in response to the magnitude of the reference voltage being within a predetermined proximity to a target value; wherein: (1) the reference module is further adapted to decrease the magnitude of the reference voltage at a predetermined slew rate, in the slew operating mode, and (2) the switching module is further adapted to control the power stage of the DC-to-DC converter to regulate the magnitude of the output voltage according to the magnitude of the reference voltage, in the slew operating mode.

(B5) The controller denoted as (B4) may further include a multi-phase control module adapted to control how many power stages of the DC-to-DC converter are operating in the slew operating mode, according to a magnitude of a load current of the DC-to-DC converter.

(B6) In any of the controllers denoted as (B1) through (B5), the reference module may be further adapted to, in response to a command to change to a different operating mode: (1) increase the magnitude of the reference voltage at a first predetermined slew rate until the magnitude of the reference voltage reaches a threshold value; and (2) increase the magnitude of the reference voltage at a second predetermined slew rate after the magnitude of the reference voltage reaches the threshold value, the first predetermined slew rate being greater than the second predetermined slew rate.

(C1) A DC-to-DC converter including an unregulated operating mode may include: (1) at least one power stage electrically coupled between an input port and an output port; and (2) a controller communicatively coupled to the at least one power stage, the controller including: (a) a reference module adapted to generate a reference voltage, such that: (i) a magnitude of the reference voltage is fixed, in a regulated operating mode, and (ii) the magnitude of the reference voltage tracks a magnitude of an output voltage across the output port, in the unregulated operating mode, and (b) a switching module adapted to control the at least one power stage to regulate the magnitude of the output voltage according to the magnitude of the reference voltage, in the regulated operating mode.

(C2) In the DC-to-DC converter denoted as (C1), the switching module may be further adapted to control the at least one power stage such the magnitude of the output voltage is allowed to fall, in the unregulated operating mode.

(C3) In either of the DC-to-DC converters denoted as (C1) or (C2), the reference module may be further adapted to, in the unregulated operating mode: (1) compare the magnitude of the output voltage to the magnitude of the reference voltage; and (2) decrease the magnitude of the reference voltage by a predetermined amount in response to the magnitude of the output voltage being equal to the magnitude of the reference voltage.

(C4) In any of the DC-to-DC converters denoted as (C1) through (C3): (1) the controller may be adapted to change from the unregulated operating mode to a slew operating mode in response to the magnitude of the reference voltage being within a predetermined proximity to a target value; (2) the reference module may be further adapted to decrease the magnitude of the reference voltage at a predetermined slew rate, in the slew operating mode; and (3) the switching module may be further adapted to control the at least one power stage of the DC-to-DC converter to regulate the magnitude of the output voltage according to the magnitude of the reference voltage, in the slew operating mode.

(C5) In the DC-to-DC converter denoted as (C4), the at least one power stage may include a plurality of power stages, and the controller may further include a multi-phase control module adapted to control how many of the plurality of power stages are operating in the slew operating mode, according to a magnitude of a load current of the DC-to-DC converter.

(C6) In any of the converters denoted as (C1) through (C5), the reference module may be further adapted to, in response to a command to transition to a different operating mode: (1) increase the magnitude of the reference voltage at a first predetermined slew rate until the magnitude of the reference voltage reaches a threshold value; and (2) increase the magnitude of the reference voltage at a second predetermined slew rate after the magnitude of the reference voltage reaches the threshold value, the first predetermined slew rate being greater than the second predetermined slew rate.

(C7) In any of the DC-to-DC converters denoted as (C1) through (C6), the at least one power stage may have a buck-type DC-to-DC converter topology.

(C8) In any of the DC-to-DC converters denoted as (C1) through (C6), the at least one power stage may have a multiphase buck-type DC-to-DC converter topology.

(C9) In any of the DC-to-DC converters denoted as (C1) through (C8), the switching module may be further adapted to: (1) control the at least one power stage to transfer power between the input port and the output port, in the regulated operating mode; and (2) cease transfer of power between the input port and the output port, in response to a change from the regulated operating mode to the unregulated operating mode.

Changes may be made in the above methods, systems, and devices without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for controlling a DC-to-DC converter including an unregulated operating mode, comprising:
    in a first regulated operating mode, regulating a magnitude of an output voltage of the DC-to-DC converter according to a magnitude of a reference voltage, the output voltage of the DC-to-DC converter being a voltage across an output port of the DC-to-DC converter;
    in response to a command to enter the unregulated operating mode, allowing the magnitude of the output voltage to fall;
    adjusting the magnitude of the reference voltage to track the magnitude of the output voltage as the magnitude of the output voltage falls; and
    in response to the magnitude of the output voltage falling to a target value while the DC-to-DC converter operates in the unregulated operated mode, changing operating mode of the DC-to-DC converter to regulate the magnitude of the output voltage according to the magnitude of the reference voltage such that the magnitude of the output voltage is less than the magnitude of the output voltage in the first regulated operating mode.

2. The method of claim 1, the step of adjusting the magnitude of the reference voltage to track the magnitude of the output voltage comprising adjusting the magnitude of the reference voltage in a step-wise manner.

3. The method of claim 2, the step of adjusting the magnitude of the reference voltage to track the magnitude of the output voltage further comprising:
    comparing the magnitude of the output voltage to the magnitude of the reference voltage; and
    decreasing the magnitude of the reference voltage by a predetermined amount in response to the magnitude of the output voltage being equal to the magnitude of the reference voltage.

4. The method of claim 2, further comprising:
    comparing the magnitude of the reference voltage to the target value; and
    in response to the magnitude of the reference voltage being within a predetermined proximity to the target value, operating in a slew operating mode including:
        decreasing the magnitude of the reference voltage at a predetermined slew rate until the magnitude of the reference voltage reaches the target value, and
        regulating the magnitude of the output voltage according to the magnitude of reference voltage while decreasing the magnitude of the reference voltage at the predetermined slew rate.

5. The method of claim 4, further comprising, in response to a command to change to a different operating mode, changing the magnitude of the reference voltage from the target value to a new value.

6. The method of claim 4, wherein the slew operating mode further includes controlling how many power stages of the DC-to-DC converter are operating according to a magnitude of a load current of the DC-to-DC converter.

7. The method of claim 2, further comprising, in response to a command to change to a different operating mode:

increasing the magnitude of the reference voltage at a first predetermined slew rate until the magnitude of the reference voltage reaches a threshold value; and increasing the magnitude of the reference voltage at a second predetermined slew rate after the magnitude of the reference voltage reaches the threshold value, the first predetermined slew rate being greater than the second predetermined slew rate.

8. The method of claim 1, wherein:

the step of regulating the magnitude of the output voltage of the DC-to-DC converter according to the magnitude of the reference voltage comprises transferring power between an input port of the DC-to-DC converter and the output port of the DC-to-DC converter; and the step of allowing the magnitude of the output voltage to fall comprises ceasing transfer of power between the input port and the output port.

9. The method of claim 8, wherein:

the DC-to-DC converter comprises at least one switching device;

the step of regulating the magnitude of the output voltage according to the magnitude the reference voltage comprises repeatedly switching the at least one switching device between its conductive and non-conductive states; and the step of allowing the magnitude of the output voltage to fall comprises continuously operating the at least one switching device in its non-conductive state.

10. The method of claim 9, wherein each of the steps of regulating the magnitude of the output voltage according to the magnitude the reference voltage comprises regulating the magnitude of the output voltage such that the magnitude of the output voltage is substantially equal to the magnitude of the reference voltage.

11. The method of claim 9, wherein each of the steps of regulating the magnitude of the output voltage according to the magnitude the reference voltage comprises regulating the magnitude of the output voltage such that the magnitude of the output voltage has a predetermined relationship to the magnitude of the reference voltage.

12. A controller for a DC-to-DC converter including an unregulated operating mode, comprising:

a reference module configured to generate a reference voltage, such that:
  (a) a magnitude of the reference voltage is fixed at a first value, in a first regulated operating mode,
  (b) the magnitude of the reference voltage tracks a magnitude of an output voltage of the DC-to-DC converter, in the unregulated operating mode, and
  (c) the magnitude of the reference voltage is fixed at a second value that is less than the first value, in a second regulated operating mode;

a switching module configured to control a power stage of the DC-to-DC converter to regulate the magnitude of the output voltage according to the magnitude of the reference voltage, in the first and second regulated operating modes; and an operating mode module configured to:
  cause the DC-to-DC converter to operate in the unregulated operating mode in response to a command to enter the unregulated operating mode, and
  cause the DC-to-DC converter to operate in the second regulated operating mode in response to the magnitude of the output voltage falling to a target value.

13. The controller of claim 12, the switching module being further configured to control the power stage such the magnitude of the output voltage is allowed to fall, in the unregulated operating mode.

14. The controller of claim 13, the reference module being further configured to, in the unregulated operating mode:

compare the magnitude of the output voltage to the magnitude of the reference voltage; and decrease the magnitude of the reference voltage by a predetermined amount in response to the magnitude of the output voltage being equal to the magnitude of the reference voltage.

15. The controller of claim 13, wherein:

the operating mode module is further configured to change an operating mode of the DC-to-DC converter from the unregulated operating mode to a slew operating mode in response to the magnitude of the reference voltage being within a predetermined proximity to the target value;

the reference module is further configured to decrease the magnitude of the reference voltage at a predetermined slew rate, in the slew operating mode; and the switching module is further configured to control the power stage of the DC-to-DC converter to regulate the magnitude of the output voltage according to the magnitude of the reference voltage, in the slew operating mode.

16. The controller of claim 15, further comprising a multi-phase control module configured to control how many power stages of the DC-to-DC converter are operating in the slew operating mode, according to a magnitude of a load current of the DC-to-DC converter.

17. The controller of claim 13, the reference module being further configured to, in response to a command to change to a different operating mode:

increase the magnitude of the reference voltage at a first predetermined slew rate until the magnitude of the reference voltage reaches a threshold value; and increase the magnitude of the reference voltage at a second predetermined slew rate after the magnitude of the reference voltage reaches the threshold value, the first predetermined slew rate being greater than the second predetermined slew rate.

18. A DC-to-DC converter including an unregulated operating mode, comprising:

at least one power stage electrically coupled between an input port and an output port; and a controller communicatively coupled to the at least one power stage, the controller including:
  a reference module configured to generate a reference voltage, such that:
    (a) a magnitude of the reference voltage is fixed at a first value, in a first regulated operating mode,
    (b) the magnitude of the reference voltage tracks a magnitude of an output voltage across the output port, in the unregulated operating mode, and
    (c) the magnitude of the reference voltage is fixed at a second value that is less than the first value, in a second regulated operating mode,
  a switching module configured to control the at least one power stage to regulate the magnitude of the output voltage according to the magnitude of the reference voltage, in the first and second regulated operating modes, and
  an operating mode module configured to:

cause the DC-to-DC converter to operate in the unregulated operating mode in response to a command to enter the unregulated operating mode, and cause the DC-to-DC converter to operate in the second regulated operating mode in response to the magnitude of the output voltage falling to a target value.

19. The DC-to-DC converter of claim 18, the switching module being further configured to control the at least one power stage such the magnitude of the output voltage is allowed to fall, in the unregulated operating mode.

20. The DC-to-DC converter of claim 18, wherein the switching module is further configured to:

control the at least one power stage to transfer power between the input port and the output port, in the first and second regulated operating modes; and cease transfer of power between the input port and the output port, in response to a change from the regulated operating mode to the unregulated operating mode.

* * * * *